US011814509B2

(12) United States Patent
Gahleitner et al.

(10) Patent No.: US 11,814,509 B2
(45) Date of Patent: Nov. 14, 2023

(54) POLYPROPYLENE COMPOSITION

(71) Applicant: BOREALIS AG, Vienna (AT)

(72) Inventors: Markus Gahleitner, Linz (AT); Jingbo Wang, Linz (AT); Friedrich Berger, Linz (AT); Jani Aho, Porvoo (FI)

(73) Assignee: BOREALIS AG, Vienna (AT)

( * ) Notice: Subject to any disclaimer, the term of this patent is extended or adjusted under 35 U.S.C. 154(b) by 428 days.

(21) Appl. No.: 17/045,422

(22) PCT Filed: Apr. 9, 2019

(86) PCT No.: PCT/EP2019/058861
§ 371 (c)(1),
(2) Date: Oct. 5, 2020

(87) PCT Pub. No.: WO2019/197357
PCT Pub. Date: Oct. 17, 2019

(65) Prior Publication Data
US 2022/0049078 A1 Feb. 17, 2022

(30) Foreign Application Priority Data
Apr. 10, 2018 (EP) .................................. 18166433

(51) Int. Cl.
C08F 210/02 (2006.01)
C08F 210/06 (2006.01)
C08F 210/08 (2006.01)
C08L 23/14 (2006.01)

(52) U.S. Cl.
CPC ............ C08L 23/14 (2013.01); C08F 210/02 (2013.01); C08F 210/06 (2013.01); C08F 210/08 (2013.01); C08L 2201/10 (2013.01); C08L 2203/02 (2013.01); C08L 2203/162 (2013.01); C08L 2314/02 (2013.01)

(58) Field of Classification Search
CPC ........ C08F 10/04; C08F 10/06; C08F 210/04; C08F 210/06
See application file for complete search history.

(56) References Cited

U.S. PATENT DOCUMENTS

| 5,948,547 A | 9/1999 | Mikielski et al. |
| 6,221,984 B1 | 4/2001 | Kersting et al. |
| 10,150,828 B2 | 12/2018 | Cavalieri et al. |
| 2005/0142367 A1 | 6/2005 | Su et al. |
| 2005/0197456 A1 | 9/2005 | Nicolini et al. |

FOREIGN PATENT DOCUMENTS

| CN | 1275144 A | 11/2000 |
| CN | 1898307 A | 1/2007 |
| EP | 0887379 B1 | 12/1998 |
| EP | 2965908 A1 | 1/2016 |
| WO | 92/12182 A1 | 7/1992 |
| WO | 99/24478 A1 | 5/1999 |
| WO | 99/24479 A1 | 5/1999 |
| WO | 00/11076 A1 | 3/2000 |
| WO | 00/68315 A1 | 11/2000 |
| WO | 2003/000754 A1 | 1/2003 |
| WO | 2003/000757 A1 | 1/2003 |
| WO | 2004/000899 A1 | 12/2003 |
| WO | 2004/029112 A1 | 4/2004 |
| WO | 2004/111095 A1 | 12/2004 |
| WO | 2005066247 A1 | 7/2005 |
| WO | 2007/137853 A1 | 12/2007 |
| WO | 2009/019169 A1 | 2/2009 |
| WO | 2013/174778 A1 | 11/2013 |
| WO | 2015/086213 A1 | 6/2015 |
| WO | 2016/146578 A1 | 9/2016 |
| WO | 2017/021137 A1 | 2/2017 |

OTHER PUBLICATIONS

Applicant: Borealis AG, "Polypropylene Composition"; Chinese Application No. 201980024780.4, Chinese Office Action dated Aug. 9, 2022, 16 pgs.
Moore, Jr., Edward P., "Polypropylene Handbook, Polymerization, Characterization, Properties, Processing, Applications," pp. 192-193, 1996.
EPO Opposition dated Dec. 17, 2020.
Declaration of Oliver Halleux.
Busico, Vincenzo, et al., "Microstructure of Polypropylene", Prog. Polym. Sci. 26 (2001) 443-533.
Busico, Vincenzo, et al., "Full Assignment of the 13C NMR Spectra or Regioregular Polypropylenes: Methyl and Methylene Region", Macromolecules 1997, 30, 6251-6263.
Busico, Vincenzo, et al., "ALK-1-ENE Polymerization in the Presence of a Monocyclopentadienyl Zirconium(IV) Acetamidinate Catalyst: Microstructural and Mechanistic Insights", Macromol. Rapid Commun. 2007, 28, 1128-1137.
Castignolles, Patrice, et al., "Detection and quantification of branching in polyacrylates by size-exclusion chromotography (SEC) and melt-state 13C Nmr Spectroscopy", Polymer 50 (2009) 2373-2383.
Cheng, et al., "13C NMR Analysis of Ethylene-Propylene Rubbers", Macromolecules 17, 1984, 1950-1955.
Extended European Search Report dated Sep. 19, 2018.
Filip, Xenia, et al, "Heteronuclear Decoupling Under Fast Mas by a Rotor-Synchronized Hahn-Echo Pulse Train", Journal of Magnetic Rosonance 176 (2005) 239-243.
Griffin, John M., et al. "Low-Load Rotor-Synchronized Hahn-Echo Pulse Train (RS-HEPT) 1H Decoupling in Solid-State NMR:Factors Affecting Mas Spin-Echo Dephasing Times", Magn. Reson. Chem. 2007; 45:S198-S208.
Klimke, Katja, et al., "Optimisation and Application of Polyolefin Branch Quantification by Melt-State 13CNMR Spectroscopy", Macromol. Chem. Phys. 2006, 207, p. 382-395.

(Continued)

Primary Examiner — Irina S Zemel
Assistant Examiner — Jeffrey S Lenihan
(74) Attorney, Agent, or Firm — TAROLLI, SUNDHEIM, COVELL & TUMMINO L.L.P.

(57) ABSTRACT

New polypropylene composition, which combines low sealing initiation temperature (SIT), high hot-tack and good optical properties, like low haze, the use of such polypropylene composition and articles made therefrom.

15 Claims, No Drawings

(56) References Cited

OTHER PUBLICATIONS

Pollard, M. Pollard, et al., "Observation of Chain Branching in Polyethylene in the Solid State and Melt Via 13C NMR Spectroscopy and Melt NMR Relation Time Measurements", Macromolecules 2004, 37, 813-825.
Randall, James c., "A Review of High Resolution Liquid 13carbon Nuclear Magnetic Resonance Characterizations of Ethylene-Based Polymers", Journal of macromolecular science, C29():201 1989.
Resconi, Luigi, et al., "Selectivity in Propane Polymerization With Metallocene Catalysts", Chem. Rev. 2000, 100, 1253-1345.
Singh, Gurmeet, et al., "Triad Sequence Determination of Ethylene—Propylene Copolymers—Application of Quantitative 13C NMR", Polymer Testing 28 (2009) 475-479.
Wang, Wen-Jun, et al., "Structural Analysis of Ethylene/Propylene Copolymers Synthesized With a Constrained Geometry Catalyst", Macromolecules 2000, 33, 1157-1162.
Zhou, Zhe, et al., "A New Decoupling Method for Accurate Quantification of Polyethylene Copolymer Composition and Triad Sequence Distribution With 13C NMR", Journal of Magnetic Resonance 187 (2007) 225-233.
Kakugo, Masahiro, et al., "13C NMR Determination of Monomer Sequence Distribution in Ethylene-Propylene Copolymers Prepared with d-TiC13-Al(C2H5)2 Cl" Macromolecules 1982, 15, 1150-1152.

POLYPROPYLENE COMPOSITION

The present invention is related to a new polypropylene composition, which combines low sealing initiation temperature (SIT), high hot-tack and good optical properties, like low haze.

The present invention is furthermore related to the use of the polypropylene composition and articles made therefrom.

Polypropylenes are suitable for many applications

For instance, polypropylene (PP) is applicable in areas where sealing properties play an important role, like in the food or medical packing industry.

Heat sealing is the predominant method of manufacturing flexible and semi-rigid packages.

An important indication of good sealing performance is inter alia a low seal initiation temperature (SIT), which is needed to support high speed on packaging machines.

To ensure fast sealing, a low SIT is of advantage. Operating at lower temperature has the benefit that the article to be sealed is not exposed to high temperatures. There are also economic advantages since lower temperatures are of course cheaper to generate and maintain.

There are further advantages in avoiding high sealing temperatures, especially when temperature sensitive goods are to be packed.

Particularly demanding applications of films, like form and fill packaging require, besides low seal initiation temperature, good hot-tack properties. Hot-tack is the bonding strength measurable while the polymer in the heat-sealed portion of a film is in a semi-molten/solidifying state.

This bonding strength is expressed here and hereafter as the hot tack force (N) needed to tear apart sealed layers. The hot-tack is generally an important factor to improve the efficiency of a packaging production process.

Additionally, it is also desired to have a packaging material with satisfying optical properties, such as low haze.

Furthermore packaged goods, like packaged food or medicals, needs to withstand a sterilization step, like steam sterilization. Steam sterilization is normally operated under a temperature of more than 120° C., like 121° C. This means that the melting temperature of the packaging film needs to be significantly higher, like more than 125° C., preferably more than 130° C.

All film manufacturers, whether making multilayer or monolayer films are looking to maximise the properties of the film it produces. Maximising properties is normally easier with multilayer films as each layer can be tailored to provide a particular attribute of need. It is common for example to use an outer layer, which can give rise to good sealing properties whilst a core layer might be used to provide mechanical strength to a film. Moreover, when using a multilayer construction, incompatibility between film components can be avoided by placing these in separate layers.

When a film is mono-layered however, the options available to the film manufacturer are much more limited. It is currently very difficult to prepare monolayer films having optimal properties, e.g. good mechanical and processing properties and the person skilled in the art is therefore looking for new films, which can provide improvements to these. Especially problematic are optical properties as the more components used in a monolayer film, the higher the haze value of the film tends to be.

The problem faced by the film manufacturer is that by trying to improving one property, another equally important property tends to be detrimentally affected. There are also real problems of compatibility between different polymers in a monolayer construction where all components are extruded together as a blend. If polymer components are not compatible, inhomogeneity is evident in the formed film, which is unacceptable for the manufacturer and consumer. This limits still further the parameters which the film chemist can manipulate.

Polypropylene terpolymers, e.g. $C_2C_3C_4$-terpolymers, are widely used in this application field due to the combination of good film properties and sealing behaviour. It is generally known that $C_2C_3C_4$-terpolymers can outperform $C_2C_3$-random copolymers in the sense of lower SIT, higher hot tack and good optics, also after sterilization.

However, film manufacturers still are looking for an even better combination with improved properties, like a combination of low SIT with higher hot tack and superior transparency.

Several attempts have been made to solve the problems mentioned above.

WO 2013174778 describes a propylene, ethylene, 1-butene terpolymer containing from 0.5 wt % to 2.2 wt % of ethylene derived units and from 6.0 wt % to 20.0 wt % of 1 butene derived units;

wherein:

i) the ratio $C_2$ wt %/$C_4$ wt % ranges from 0.12 to 0.06; wherein $C_2$ wt % is the weight percent of ethylene derived units and $C_4$ wt % is the weight percent of 1-butene derived units; ii) the melt flow rate ranges from 0.4 to 54 g/10 min;

iii) the xylene soluble (XCS) fraction at 25° C. is lower than 15.0 wt % the minimum value being 5.0 wt %.

No hot-tack values are given and furthermore it is not mentioned, if these terpolymers are able to withstand steam sterilization at >120° C.

In addition the terpolymers are not visbroken.

WO 2015086213 describes a propylene ethylene 1-butene terpolymer wherein:

(i) the content of ethylene derived units ranges from 1.1 wt % to 1.9 wt %, (ii) the content of 1-butene ranges from 5.0 wt % to 9.0 wt %, (iii) the melting point (Tm) of the non nucleated terpolymer ranges from 125° C. to 137° C.;

(iv) the xylene soluble (XCS) fraction at 25° C. is lower than 8.0 wt %.

Again, no hot-tack values are given and furthermore it is not mentioned, if these terpolymers are able to withstand steam sterilization at >120° C.

Also these terpolymers are not visbroken.

US 20050142367 proposes to use a blend of a propylene-1-butene-ethylene terpolymer with a metallocene catalyzed ethylene polymer for a heat sealable skin layer of a three-layer BOPP film to provide low seal initiation temperature (SIT) and good hot-tack properties.

The metallocene catalyzed ethylene polymer can have a melt flow rate ($MFR_2$; 190° C., 2.16 kg) in the range of from 2.0 to 7.5 g/10 min and a density in the range of from 0.878 to 0.900 g/cm$^3$.

The propylene-1-butene-ethylene terpolymer used in the examples contains a relatively high amount of comonomers, namely 1.1 wt % (i.e. 1.7 mol %) of ethylene and 20.0 wt % (i.e. 16.2 mol %) of 1-butene.

The melting point of such compositions will be by far too low in order to withstand steam sterilization at >120° C. In addition the SIT is too low as well (71-93° C.), which also creates problems in steam sterilization.

Optical properties like haze are not mentioned.

However, although much development work has already been done in the field of films suitable for different kinds of packaging, the films as disclosed in the prior art still do not provide a sufficient balance of low sealing initiation temperature (SIT) in combination with high hot-tack and improved optics, which are in addition suitable for sterilization.

Thus, there still exists a need for novel and improved film structures, providing films with improved sealing behaviour, i.e. lower sealing initiation temperature (SIT) and higher hot-tack force, in combination with improved optics.

Surprisingly the inventors found, that the above problems can be solved by visbreaking of the terpolymers, in order to increase the MFR of the terpolymers obtained from the polymerization reactor(s).

SUMMARY OF THE INVENTION

Accordingly, the present invention relates in a first aspect to a polypropylene composition comprising
(A) at least 50.0 wt % of a propylene terpolymer comprising
(i) ethylene-derived comonomer units in an amount of from 0.5 to 3.0 wt % and
(ii) comonomer units derived from a $C_4$ to $C_{10}$ α-olefin in an amount of from 5.5 to 15.0 wt %,
whereby the terpolymer has been visbroken with a visbreaking ratio (VR)
as defined by equation (1)
$$VR = MFR_{final}/MFR_{start} > 1.5$$
wherein
"$MFR_{final}$" is the $MFR_2$ (230° C./2.16 kg) of the propylene terpolymer copolymer after visbreaking and "$MFR_{start}$" is the $MFR_2$ (230° C./2.16 kg) of the propylene terpolymer copolymer before visbreaking, whereby the $MFR_{final}$ (230° C., 2.16 kg, ISO1133) is in a range of 1.5 to 15.0 g/10 min and
(B) optionally one or more additives in a total amount of from 0.0 up to 5.0 wt %, based on the composition, selected from the group comprising slip agents, antiblock agents, UV stabilizers, alpha and/or beta nucleating agents, antistatic agents, antioxidants.

It has surprisingly been found out, that such compositions have an optimized or improved sealing behaviour, i.e. low sealing initiation temperature SIT and high hot-tack, in combination with beneficial optical properties.

In an embodiment of the present invention, the propylene terpolymer (a) is obtainable, preferably obtained, in the presence of a Ziegler-Natta catalyst.

In another embodiment, the present invention is related to a monolayer film made of the above identified composition.

In a further aspect, the present invention is related to the use of the monolayer films according to the invention for lamination or mono- or multilayer films for packaging films and medical/hygienic films.

As alternative in one further aspect the present invention is related to the use of the monolayer films according to the invention as sealing layer in a polypropylene multi-layer film, which can be manufactured either by co-extrusion or lamination.

DETAILED DESCRIPTION

The polypropylene composition of the present inventions comprises (A) at least 50.0 wt % of a propylene terpolymer, which has been visbroken.

The propylene terpolymer used in the polypropylene composition of the invention is a random terpolymer and comprises at least ethylene as first comonomer and a $C_4$ to $C_{10}$ α-olefin as the second comonomer.

Accordingly, the propylene terpolymer comprises units derived from propylene and from ethylene and from one further α-olefin selected from the group consisting of $C_4$-α-olefin, $C_5$-α-olefin, $C_6$-α-olefin, $C_7$-α-olefin, $C_8$-α-olefin, $C_9$-α-olefin and $C_{10}$-α-olefin.

More preferably the propylene terpolymer comprises units derived from propylene and from ethylene and one other α-olefin selected from the group consisting of 1-butene, 1-pentene, 1-hexene, 1-heptene, 1-octene, 1-nonene and 1-decene, wherein 1-butene and 1-hexene are even more preferred.

It is in particular preferred that the propylene terpolymer consists of units derived from propylene, ethylene and 1-butene or from propylene, ethylene and 1-hexene.

Most preferred the propylene terpolymer consists of units derived from propylene, ethylene and 1-butene.

The propylene terpolymer used in the polypropylene composition according to this invention is featured by a moderate to low comonomer content.

Accordingly, the propylene terpolymer used in the polypropylene composition according to this invention shall have an ethylene content of at least 0.5 wt %.

Thus it is preferred that the propylene terpolymer has an ethylene content in the range of from 0.5 wt % to 3.0 wt %, more preferably in the range of from 0.5 to 2.5 wt %, still more preferably in the range of from 0.5 to 2.0 wt %, especially in the range of from 0.5 to 1.5 wt %, like 0.5 to 1.1 wt %.

Moreover, the propylene terpolymer shall have a $C_4$ to $C_{10}$ α-olefin, preferably a $C_4$ or $C_6$ α-olefin comonomer content of at least 5.5 wt %.

Thus it is preferred, that the propylene terpolymer has an $C_4$ to $C_{10}$ α-olefin, preferably a $C_4$ or $C_6$ α-olefin comonomer content in the range of from 5.5 to 15.0 wt %, more preferably in the range of from 5.5 to 12.0 wt %, still more preferably in the range of from 5.5 to 10.0 wt %, especially in the range of from 5.8 to 8.0 wt %.

Preferably the terpolymer has a rather high content of propylene ($C_3$), i.e. at least 82.0 wt %, i.e. equal or more than 86.0 wt %, more preferably equal or more than 88.0 wt %, yet more preferably equal or more than 90.0 wt %, like equal or more than 91.0 wt %.

The propylene terpolymer originally (i.e. before visbreaking) has a melt flow rate $MFR_2$ (230° C.) measured according to ISO 1133 (i.e. "$MFR_{start}$") in the range of from 0.5 to lower than 10.0 g/10 min, preferably in the range of from 0.8 to 8.0 g/10 min, more preferably in the range of from 1.0 to 6.0 g/10 min and still more preferably in range of from 1.2 to 4.0 g/10 min.

Alternatively, the visbroken propylene terpolymer can be defined by the xylene cold soluble (XCS) content measured according to ISO 6427. Accordingly, the visbroken propylene terpolymer is preferably featured by a xylene cold soluble (XCS) content of below 20.0 wt %, more preferably of below 15.0 wt %.

Thus, it is in particular appreciated that the visbroken propylene terpolymer has a xylene cold soluble (XCS) content in the range of 3.0 to below 20.0 wt %, more preferably in the range of 5.0 to below 15.0 wt % and most preferably in the range of 5.0 to 13.0 wt %.

Alternatively, the visbroken propylene terpolymer can be defined by the melting temperature (Tm) measured via DSC according to ISO 11357. Accordingly, the propylene terpolymer preferably has a melting temperature Tm of equal or higher than 130° C. More preferably, the melting temperature Tm is in the range of 130° C. to 145° C., even more preferably in the range of 132° C. to 142° C., like 133° C. to 141° C.

The propylene terpolymer can be further unimodal or multimodal, like bimodal in view of the molecular weight distribution and/or the comonomer content distribution; both unimodal and bimodal propylene terpolymers are equally preferred.

If the propylene terpolymer is unimodal, it is preferably produced in a single polymerization step in one polymerization reactor (R1). Alternatively, a unimodal propylene terpolymer can be produced in a sequential polymerization process using the same polymerization conditions in all reactors.

If the propylene terpolymer is multimodal, it is preferably produced in a sequential polymerization process using different polymerization conditions (amount of comonomer, hydrogen amount, etc.) in the reactors.

The propylene terpolymer can be produced by polymerization in the presence of any conventional coordination catalyst system including Ziegler-Natta, chromium and single site (like metallocene catalyst), preferably the propylene terpolymer is produced in the presence of a Ziegler-Natta catalyst system.

The propylene terpolymer can be produced in a single polymerization step comprising a single polymerization reactor (R1) or in a sequential polymerization process comprising at least two polymerization reactors (R1) and (R2), whereby in the first polymerization reactor (R1) a first propylene polymer fraction (R-PP1) is produced, which is subsequently transferred into the second polymerization reactor (R2). In the second polymerization reactor (R2) a second propylene polymer fraction (R-PP2) is then produced in the presence of the first propylene polymer fraction (R-PP1).

If the propylene terpolymer is produced in at least two polymerization reactors (R1) and (R2), it is possible that
i) in the first reactor (R1) a propylene homopolymer and in the second reactor (R2) a propylene terpolymer is produced, yielding the propylene terpolymer (a) or
ii) in the first reactor (R1) a propylene-ethylene copolymer and in the second reactor (R2) a propylene $C_4$ to $C_{10}$ α-olefin copolymer is produced, yielding the propylene terpolymer (a) or
iii) in the first reactor (R1) a propylene $C_4$ to $C_{10}$ α-olefin copolymer and in the second reactor (R2) a propylene-ethylene copolymer is produced, yielding the propylene terpolymer (a) or iv) in the first reactor (R1) a propylene terpolymer and in the second reactor (R2) a propylene terpolymer is produced, yielding the propylene terpolymer (a).

Polymerization processes which are suitable for producing the propylene terpolymer generally comprises one or two polymerization stages and each stage can be carried out in solution, slurry, fluidized bed, bulk or gas phase.

The term "polymerization reactor" shall indicate that the main polymerization takes place. Thus in case the process consists of one or two polymerization reactors, this definition does not exclude the option that the overall system comprises for instance a pre-polymerization step in a pre-polymerization reactor. The term "consist of" is only a closing formulation in view of the main polymerization reactors.

The term "sequential polymerization process" indicates that the propylene terpolymer is produced in at least two reactors connected in series. Accordingly, such a polymerization system comprises at least a first polymerization reactor (R1) and a second polymerization reactor (R2), and optionally a third polymerization reactor (R3).

The first, respectively the single, polymerization reactor (R1) is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention the slurry reactor is preferably a (bulk) loop reactor.

In case a "sequential polymerization process" is applied the second polymerization reactor (R2) and the optional third polymerization reactor (R3) are gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

A preferred multistage process is a "loop-gas phase"-process, such as developed by *Borealis* (known as BORSTAR® technology) described e.g. in patent literature, such as in EP 0887 379, WO 92/12182, WO 2004/000899, WO 2004/111095, WO 99/24478, WO 99/24479 or in WO 00/68315.

A further suitable slurry-gas phase process is the Spheripol® process of Basell.

Preferably, the propylene terpolymer (A) according to this invention is produced in the presence of a Ziegler-Natta catalyst.

The Ziegler-Natta catalyst is fed into the first, respectively the single, polymerization reactor (R1) and is optionally transferred with the polymer (slurry) obtained in the first polymerization reactor (R1) into the subsequent reactors, if the propylene terpolymer is produced in a sequential polymerization process.

If the process covers also a pre-polymerization step, it is preferred that all of the Ziegler-Natta catalyst is fed in the pre-polymerization reactor. Subsequently the pre-polymerization product containing the Ziegler-Natta catalyst is transferred into the first, respectively the single, polymerization reactor (R1).

This Ziegler-Natta catalyst can be any stereo-specific Ziegler-Natta catalyst for propylene polymerization, which preferably is capable of catalysing the polymerization and copolymerization of propylene and comonomers at a pressure of 500 to 10000 kPa, in particular 2500 to 8000 kPa, and at a temperature of 40 to 110° C., in particular of 60 to 110° C. Preferably, the Ziegler-Natta catalyst (ZN-C) comprises a high-yield Ziegler-Natta type catalyst including an internal donor component, which can be used at high polymerization temperatures of 80° C. or more.

Such high-yield Ziegler-Natta catalyst (ZN-C) can comprise a succinate, a diether, a phthalate etc., or mixtures therefrom as internal donor (ID) and are for example commercially available for example from LyondellBasell under the Avant ZN trade name.

Further useful solid catalysts are also those disclosed in WO-A-2003/000757, WO-A-2003/000754, WO-A-2004/029112 and WO2007/137853. These catalysts are solid catalysts of spherical particles with compact structure and low surface area of the particles. Further, these catalysts are featured by a uniform distribution of catalytically active sites thorough the catalyst particles. Catalysts are prepared by emulsion-solidification method, where no external support is needed. The dispersed phase in the form of liquid droplets of the emulsion forms the catalyst part, which is transformed to solid catalyst particles during the solidification step.

The Ziegler-Natta catalyst is preferably used in association with an alkyl aluminum cocatalyst and optionally external donors.

As further component in the instant polymerization process an external donor is preferably present. Suitable external donors include certain silanes, ethers, esters, amines, ketones, heterocyclic compounds and blends of these. It is especially preferred to use a silane. It is most preferred to use silanes of the general formula $$R^a_p R^b_q Si(OR^c)_{(4-p-q)}$$

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si (OCH$_3$)$_2$, (phenyl)$_2$Si(OCH$_3$)$_2$ and (cyclopentyl)$_2$Si (OCH$_3$)$_2$, or of general formula $$Si(OCH_2CH_3)_3(NR^3R^4)$$

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^3$ and $R^4$ are the same, yet more preferably both $R^3$ and $R^4$ are an ethyl group.

Especially preferred external donors are the dicyclopentyl dimethoxy silane donor (D-donor) or the cyclohexylmethyl dimethoxy silane donor (C-Donor).

In addition to the Ziegler-Natta catalyst and the optional external donor, a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst is a trialkylaluminium, like triethylaluminium (TEAL), dialkyl aluminium chloride or alkyl aluminium dichloride or mixtures thereof. In one specific embodiment the co-catalyst is triethylaluminium (TEAL).

Preferably the ratio between the co-catalyst (Co) and the external donor (ED) [Co/ED] and/or the ratio between the co-catalyst (Co) and the transition Metal™ [Co/TM] should be carefully chosen.

Accordingly,
(a) the mol-ratio of co-catalyst (Co) to external donor (ED) [Co/ED] must be in the range of from 5.0 to 45.0, preferably is in the range of from 5.0 to 35.0, more preferably is in the range of from 5.0 to 25.0; and optionally
(b) the mol-ratio of co-catalyst (Co) to titanium compound (TC) [Co/TC] must be in the range of above 80.0 to 500.0, preferably is in the range of from 100.0 to 350.0, still more preferably is in the range of from 120.0 to 300.0.

The propylene terpolymer used according to this invention is thus preferably produced in the presence of
(a) a Ziegler-Natta catalyst comprising an internal donor,
(b) optionally a co-catalyst (Co), and
(c) optionally an external donor (ED).

According to the present invention, the propylene terpolymer is visbroken.

Visbreaking is a controlled degradation of polypropylene (PP) to give a product having a lower molecular weight and a narrower molecular weight distribution is a commercially important process for producing 'controlled rheology' polypropylene (CR-PP).

Known degradation processes proceed either thermally, in particular at temperatures above 280° C., or in the presence of free-radical generators. Free-radical generators used are organic peroxides.

By visbreaking the propylene terpolymer with peroxides, the molar mass distribution (MWD) becomes narrower because the long molecular chains are more easily broken up or scissored and the molar mass M, will decrease, corresponding to an MFR$_2$ increase. The MFR$_2$ increases with increase in the amount of peroxide which is used.

The visbroken propylene terpolymer has a higher melt flow rate than the non-visbroken propylene terpolymer.

According to the present invention, the propylene terpolymer has been visbroken with a visbreaking ratio (VR) as defined by equation (1)

$$VR = MFR_{final}/MFR_{start} > 1.5 \qquad (1)$$

wherein
"MFR$_{final}$" is the MFR2 (230° C./2.16 kg) of the propylene terpolymer copolymer after visbreaking and
"MFR$_{start}$" is the MFR2 (230° C./2.16 kg) of the propylene terpolymer copolymer before visbreaking,
whereby the MFR$_{final}$ (230° C., 2.16 kg, ISO1133) is in a range of 1.5 to 15.0 g/10 min.

Said visbreaking ratio (VR) is preferably in the range of >1.5 to 5.0, more preferably in the range of 2.0 to 4.5 and even more preferably in the range of 2.5 to 4.2.

The MFR$_{final}$ (230° C., 2.16 kg, ISO1133) is in a range of 1.5 to 15.0 g/10 min, preferably in the range of 3.0 to 12.0 g/10 min and more preferably in the range of 5.0 to 10.0 g/10 min.

By visbreaking the propylene terpolymer with heat or at more controlled conditions with peroxides, the molar mass distribution (MWD) becomes narrower because the long molecular chains are more easily broken up or scissored and the molar mass M, will decrease, corresponding to an MFR$_2$ increase. The MFR$_2$ increases with increase in the amount of peroxide which is used.

Such visbreaking may be carried out in any known manner, like by using a peroxide visbreaking agent. Typical visbreaking agents are 2,5-dimethyl-2,5-bis(tert.butyl-peroxy)hexane (DHBP) (for instance sold under the tradenames Luperox 101 and Trigonox 101), 2,5-dimethyl-2,5-bis(tert-.butyl-peroxy)hexyne-3 (DYBP) (for instance sold under the tradenames Luperox 130 and Trigonox 145), dicumyl-peroxide (DCUP) (for instance sold under the tradenames Luperox DC and Perkadox BC), di-tert.butyl-peroxide (DTBP) (for instance sold under the tradenames Trigonox B and Luperox Di), tert.butyl-cumyl-peroxide (BCUP) (for instance sold under the tradenames Trigonox T and Luperox 801) and bis (tert.butylperoxy-isopropyl)benzene (DIPP) (for instance sold under the tradenames Perkadox 14S and Luperox DC). Suitable amounts of peroxide to be employed in accordance with the present invention are in principle known to the skilled person and can easily be calculated on the basis of the amount of propylene terpolymer to be subjected to visbreaking, the $MFR_2$ (230° C./2.16 kg) value of the propylene terpolymer to be subjected to visbreaking and the desired target $MFR_2$ (230° C./2.16 kg) of the product to be obtained. Accordingly, typical amounts of peroxide visbreaking agent are from 0.005 to 0.7 wt %, more preferably from 0.01 to 0.4 wt %, based on the total amount of propylene terpolymer employed.

Typically, visbreaking in accordance with the present invention is carried out in an extruder, so that under the suitable conditions, an increase of melt flow rate is obtained. During visbreaking, higher molar mass chains of the starting product are broken statistically more frequently than lower molar mass molecules, resulting as indicated above in an overall decrease of the average molecular weight and an increase in melt flow rate.

The polypropylene composition of the present invention comprises at least 50.0 wt %, preferably at least 80.0 wt % and more preferably at least 95.0 wt % of the above defined visbroken propylene terpolymer (A) and may optionally contain one or more additives in a total amount of from 0.0 up to 5.0 wt %, based on the composition, selected from the group comprising slip agents, anti-block agents, UV stabilizers, acid scavengers, anti-oxidants, alpha and/or beta nucleating agents, antistatic agents, etc.

Such additives are commonly known to an art skilled person.

Slip agents are also commonly known in the art. Slip agents migrate to the surface and act as lubricants polymer to polymer and polymer against metal rollers, giving reduced coefficient of friction (CoF) as a result. Examples are fatty acid amids, like erucamides (CAS No. 112-84-5), oleamides (CAS No. 301-02-0) or stearamide (CAS No. 124-26-5).

Examples of antioxidants which are commonly used in the art, are sterically hindered phenols (such as CAS No. 6683-19-8, also sold as Irganox 1010 FF™ by BASF), phosphorous based antioxidants (such as CAS No. 31570-04-4, also sold as Hostanox PAR 24 (FF)™ by Clariant, or Irgafos 168 (FF)™ by BASF), sulphur based antioxidants (such as CAS No. 693-36-7, sold as Irganox PS-802 FL™ by BASF), nitrogen-based antioxidants (such as 4,4'-bis(1, 1'-dimethylbenzyl)diphenylamine), or antioxidant blends.

Acid scavengers are also commonly known in the art. Examples are calcium stearates, sodium stearates, zinc stearates, magnesium and zinc oxides, synthetic hydrotalcite (e.g. SHT, CAS-no. 11097-59-9), lactates and lactylates, as well as calcium stearate (CAS 1592-23-0) and zinc stearate (CAS 557-05-1);

Common antiblocking agents are natural silica such as diatomaceous earth (such as CAS-no. 60676-86-0 (Superf-Floss™), CAS-no. 60676-86-0 (SuperFloss E™), or CAS-no. 60676-86-0 (Celite 499™)), synthetic silica (such as CAS-no. 7631-86-9, CAS-no. 7631-86-9, CASno. 7631-86-9, CAS-no. 7631-86-9, CAS-no. 7631-86-9, CAS-no. 7631-86-9, CAS-no. 112926-00-8, CAS-no. 7631-86-9, or CAS-no. 7631-86-9), silicates (such as aluminium silicate (Kaolin) CAS-no. 1318-74-7, sodium aluminum silicate CAS-no. 1344-00-9, calcined kaolin CAS-no. 92704-41-1, aluminum silicate CAS-no. 1327-36-2, or calcium silicate CAS-no. 1344-95-2), synthetic zeolites (such as sodium calcium aluminosilicate hydrate CAS-no. 1344-01-0, CAS-no. 1344-01-0, or sodium calcium aluminosilicate, hydrate CAS-no. 1344-01-0)

Suitable UV-stabilisers are, for example, Bis-(2,2,6,6-tetramethyl-4-piperidyl)-sebacate (CAS 52829-07-9, Tinuvin 770); 2-hydroxy-4-n-octoxy-benzophenone (CAS 1843-05-6, Chimassorb 81)

Alpha nucleating agents like sodium benzoate (CAS 532-32-1); 1,3:2,4-bis(3,4-dimethylbenzylidene)sorbitol (CAS 135861-56-2, Millad 3988).

Suitable antistatic agents are, for example, glycerol esters (CAS No. 97593-29-8) or ethoxylated amines (CAS No. 71786-60-2 or 61791-31-9) or ethoxylated amides (CAS No. 204-393-1).

Usually these additives are added in quantities of 100-2.000 ppm for each single component.

In an embodiment the present invention is also related to a process for the preparation of the polypropylene composition as define above, the process comprising the steps of
(i) preparing the propylene terpolymer by polymerizing propylene, ethylene and a $C_4$ to $C_{10}$ α-olefin, preferably in the presence of a Ziegler-Natta catalyst,
(ii) subsequent visbreaking the propylene terpolymer and
(iii) optionally mixing said visbroken propylene terpolymer (A) with one or more additives.

Use

The present invention is not only directed to the instant polypropylene composition but also the use of the polypropylene composition for preparing articles and the articles comprising the polypropylene composition.

Suitable articles are films for flexible packaging systems, such as bags or pouches for food and pharmaceutical packaging or medical articles in general.

In an embodiment, the present invention is related to an article, the article being an unoriented mono-layer film comprising the inventive polypropylene composition. Accordingly the present invention is also directed to an article, the article being an unoriented mono-layer film, like cast film or blown film, e.g. air cooled blown film, comprising at least 90 wt %, preferably comprising at least 95 wt %, yet more preferably comprising at least 99 wt %, of the instant polypropylene composition.

The above described composition is suitable for the production of blown films as well as cast films.

Description of Film Production by Blown Film Technology

The above described composition is capable of being manufactured into water or air quench blown films, preferably air quenched blown films, on typical polyethylene blown film production equipment.

In principle the process comprising the steps of
(i) blowing up a tube of molten material with air perpendicularly to the upwards direction from a side-fed blown film die;
(ii) cooling it down with water contact cooling ring or air quench;
(iii) folding it and guiding it over deflector rolls onto the winder In the blown film process the polypropylene composition melt is extruded through an annular die and blown into a tubular film by forming a bubble which is collapsed between nip rollers after solidification. The blown extrusion can be preferably effected at a temperature in the range 160° C. to 240° C., and cooled by water or preferably by blowing gas (generally air) at a temperature of 10° C. to 50° C. to provide a frost line height of 0.5 to 8 times the diameter of the die. The blow up ratio should generally be in the range of from 1.5 to 4, such as from 2 to 4, preferably 2.5 to 3.5.

Description of Film Production by Cast Film Technology

In this most simple technology for producing polymer films, the molten blend is extruded through a slot die fed by a (normally single-screw) extruder onto a first cooled roll, the so-called chill-roll. From this roll, the already solidified film is taken up by a second roll (nip roll or take-up roll) and transported to a winding device after trimming the edges. Only a very limited amount of orientation is created in the film, which is determined by the ratio between die thickness and film thickness or the extrusion speed and the take-up speed, respectively.

Due to its technical simplicity, cast film technology is a very economical and easy-to-handle process. The films resulting from this technology are characterised by good transparency and rather isotropic mechanical properties (limited stiffness, high toughness).

Summing up the process comprises the steps of
i) pouring or spreading a solution, hot-melt or dispersion of a material onto a temporary carrier
ii) hardening the material, and
iii) stripping the hardened film from the surface of the carrier.

In case a film is produced by cast film technology the molten polypropylene composition is extruded through a slot extrusion die onto a chill roll to cool the polypropylene composition to a solid film. Typically the polypropylene composition is firstly compressed and liquefied in an extruder, it being possible for any additives to be already added to the polypropylene composition or introduced at this stage via a masterbatch. The melt is then forced through a flat-film die (slot die), and the extruded film is taken off on one or more take-off rolls, during which it cools and solidifies. It has proven particularly favourable to keep the take-off roll or rolls, by means of which the extruded film is cooled and solidified, at a temperature from 10° C. to 50° C., preferably from 15° C. to 40° C.

Monolayer films having a thickness of 5 to 300 µm, preferably 10 to 200 µm, more preferably 20 to 150 µm are suitable according to the present invention.

It has been found that such polypropylene composition according to the present invention provides the film material made thereof with a combination of low sealing initiation temperature (S.I.T), high hot-tack and beneficial optical properties, i.e. low haze.

It has been further found that such polypropylene composition according to the present invention provides the film material made thereof with sufficient thermal stability to enable sterilization treatment.

Thus, films, respectively articles according to the present invention comprising the above defined polypropylene composition are suitable for being sterilized.

Therefore, the present invention is also directed to a sterilizable or sterilized article, preferably to a sterilizable or sterilized film, like a sterilizable or sterilized film.

In a further aspect, the present invention is related to the use of the monolayer films according to the invention for lamination films or multilayer films for packaging films and medical/hygienic films, wherein the mono-layer films according to the invention comprise at least one layer.

As alternative in one further aspect the present invention is related to the use of the monolayer films according to the invention as sealing layer in a polypropylene multi-layer film, which can be manufactured either by co-extrusion or lamination.

Further, the invention is also directed to a multi-layer film construction, comprising an unoriented monolayer film as defined above as an outermost layer, i.e as sealing layer.

For being able to serve as a sealing layer in a multi-layer film construction, such an unoriented mono-layer film comprising the inventive polypropylene composition shall preferably have a sealing initiation temperature (SIT) in the range of from 90° C. to 112° C., more preferably in the range of from 95° C. to 112° C., even more preferably in the range of from 98° C. to 112° C. and yet more preferably in the range of from 100° C. to 112° C., like in the range of from 106° C. to 112° C.

In an embodiment of the invention, the difference between Tm of the visbroken terpolymer and the SIT of the film (cast film of 50 µm thickness) is Tm-SIT>24° C., preferably >25° C. A reasonable upper limit for Tm-SIT is 50° C.

Unoriented mono-layer films comprising the polypropylene composition of the present invention furthermore have a hot-tack force in the range of from 2.0 to 7.0 N (measured on a 50 µm cast film). The hot-tack force of the polypropylene composition containing films is measured according to the method description explained in the Examples section of this document.

It is preferred that the hot-tack force measured on a 50 µm cast film is in the range of from 2.2 to 6.5 N, more preferably in the range of from 2.4 to 6.0 N and even more preferably in the range of from 2.5 to 5.5 N.

A suitable lower limit is 2.0 N, preferably 2.2 N, more preferably 2.4 N and even more preferably 2.5 N. A suitable upper limit is 7.0 N, preferably 6.5 N, more preferably 6.0 N and even more preferably 5.5 N.

Furthermore, such an unoriented film comprising the inventive polypropylene composition shall preferably have a haze determined on 50 µm cast film of below 3.0%, preferably of below 2.0%, and more preferably of below 1.0 wt %.

Additionally, such an unoriented film comprising the inventive polypropylene composition shall preferably have a tensile modulus determined in accordance with ISO 527-3 on 50 µm cast film in machine direction in the range of 200 to 800 MPa, preferably in the range of 250-700 MPa, like in the range of 300 to 600 MPa.

Such unoriented films, preferably cast films, have an improved overall performance defined by $$\text{Relation }(I) = \frac{\text{Tensile modulus }(MD) \times \text{Hot} - \text{tack}}{\text{Haze } b.s.}$$

whereby relation (I) is at least 1000, preferably at least 1500 and more preferably at least 2000.

A multi-layer film construction comprising at least one layer comprising the inventive polypropylene composition is preferably produced by a lamination process or by multi-layer co-extrusion followed by film casting or film blowing. In this case, at least one of the outermost layers of said multi-layer film construction serving as sealing layer(s) shall comprise the inventive polypropylene composition as defined above. The inventive multilayer film construction shall preferably have a thickness in the range of 30 to 500 µm, more preferably in the range of 40 to 400 µm, like in the range of 50 to 300 µm. The sealing layer(s) comprising the inventive polypropylene composition shall preferably have a thickness in the range of 3 to 50 µm, more preferably in the range of 5 to 30 µm, like in the range of 8 to 25 µm.

Films and/or multi-layer film constructions according to the present invention shall preferably be used for flexible packaging systems, such as bags or pouches for food and pharmaceutical packaging or medical articles in general.

Furthermore films, respectively articles according to the present invention comprising the above defined polypropylene composition are suitable for being sterilized without negatively affecting the optical properties.

Therefore the present invention is also directed to a sterilizable or sterilized article, preferably to a sterilizable or sterilized film, like a sterilizable or sterilized film. More preferably the invention is directed to containers, i.e. pouches, especially to steam sterilizable or steam sterilized containers, i.e. pouches, preferably comprising, more preferably consisting of, the film as defined herein. The container is in particular a pouch. Further said container, i.e. pouch, has been preferably subjected to a steam sterilization treatment in a temperature range of about 120° C. to 130° C.

The films according to the invention furthermore have a haze value (determined on 50 µm cast film) after sterilization at 121° C. for 30 min of below 12.0% and preferably of below 11.0%

Methods

The xylene soluble fraction at room temperature (XCS, wt %): The amount of the polymer soluble in xylene is determined at 25° C. according to ISO 16152; 2005, 5th edition;

$MFR_2$ (230° C.) is measured according to ISO 1133 (230° C., 2.16 kg load)

The melt flow rate is measured as the $MFR_2$ in accordance with ISO 113315 (230° C., 2.16 kg load) for polypropylene. The MFR is an indication of the flowability, and hence the processability, of the polymer. The higher the melt flow rate, the lower the viscosity of the polymer.

Comonomer Content

Quantitative nuclear-magnetic resonance (NMR) spectroscopy was used to quantify the comonomer content of the polymers.

Comonomer Content Quantification of Poly(Propylene-Co-Ethylene) Copolymers

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probe head at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate ($Cr(acac)_3$) resulting in a 65 mM solution of relaxation agent in solvent {8}. To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme {3, 4}. A total of 6144 (6 k) transients were acquired per spectra. Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed {7}.

The comonomer fraction was quantified using the method of Wang et. al. {6} through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et al. {6}. Equations used for absolute propylene content were not modified.

The mole percent comonomer incorporation was calculated from the mole fraction:

$$E[\text{mol }\%]=100*fE$$

The weight percent comonomer incorporation was calculated from the mole fraction:

$$E[\text{wt }\%]=100*(fE*28.06)/((fE*28.06)+((1-fE)*42.08))$$

BIBLIOGRAPHIC REFERENCES

1—Busico, V., Cipullo, R., Prog. Polym. Sci. 26 (2001) 443.
2—Busico, V., Cipullo, R., Monaco, G., Vacatello, M., Segre, A. L., Macromoleucles 30 (1997) 6251.
3—Zhou, Z., Kuemmerle, R., Qiu, X., Redwine, D., Cong, R., Taha, A., Baugh, D. Winniford, B., J. Mag. Reson. 187 (2007) 225.
4—Busico, V., Carbonniere, P., Cipullo, R., Pellecchia, R., Severn, J., Talarico, G., Macromol. Rapid Commun. 2007, 28, 1128.
5—Resconi, L., Cavallo, L., Fait, A., Piemontesi, F., Chem. Rev. 2000, 100, 1253.
6—Wang, W-J., Zhu, S., Macromolecules 33 (2000), 1157.
7—Cheng, H. N., Macromolecules 17 (1984), 1950.
8—Singh, G., Kothari, A., Gupta, V., Polymer Testing 285 (2009), 475.
9—Kakugo, M., Naito, Y., Mizunuma, K., Miyatake, T. Macromolecules 15 (1982) 1150.
10—Randall, J. Macromol. Sci., Rev. Macromol. Chem. Phys. 1989, C29, 201.
11—Resconi, L., Cavallo, L., Fait, A., Piemontesi, F., Chem. Rev. 2000, 100, 1253.

Comonomer Content Poly(Propylene-Co-Ethylene-Co-Butene)

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probe head at 180° C. using nitrogen gas for all pneumatics. Approximately 200 mg of material was packed into a 7 mm outer diameter zirconia MAS rotor and spun at 4.5 kHz. This setup was chosen primarily for the high sensitivity needed for rapid identification and accurate quantification{1, 2, 6} Standard single-pulse excitation was employed utilising the NOE at short recycle delays{3, 1} and the RS-HEPT decoupling scheme{4, 5}. A total of 1024 (1 k) transients were acquired per spectra.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm.

Characteristic signals corresponding to regio defects were not observed {11}. The amount of propene was quantified based on the main $S\alpha\alpha$ methylene sites at 44.1 ppm:

$$P\text{total}=I_{S\alpha\alpha}$$

Characteristic signals corresponding to the incorporation of 1-butene were observed and the comonomer content quantified in the following way. The amount isolated 1-butene incorporated in PPBPP sequences was quantified using the integral of the $\alpha B2$ sites at 44.1 ppm accounting for the number of reporting sites per comonomer:

$$B=I_{\alpha B2}/2$$

The amount consecutively incorporated 1-butene in PPBBPP sequences was quantified using the integral of the $\alpha\alpha B2$ site at 40.5 ppm accounting for the number of reporting sites per comonomer:

$$BB=2*I_{\alpha\alpha B2}$$

The total 1-butene content was calculated based on the sum of isolated and consecutively incorporated 1-butene:

$$B\text{total}=B+BB$$

The total mole fraction of 1-butene in the polymer was then calculated as:

$$fB=(B\text{total}/(E\text{total}+P\text{total}+B\text{total}))$$

Characteristic signals corresponding to the incorporation of ethylene were observed and the comonomer content quantified in the following way. The amount isolated ethylene incorporated in PPEPP sequences was quantified using the integral of the $S\alpha\gamma$ sites at 37.9 ppm accounting for the number of reporting sites per comonomer:

$$E=I_{S\alpha\gamma}/2$$

With no sites indicative of consecutive incorporation observed the total ethylene comonomer content was calculated solely on this quantity:

$$E\text{total}=E$$

The total mole fraction of ethylene in the polymer was then calculated as:

$$fE=(E\text{total}/(E\text{total}+P\text{total}+B\text{total}))$$

The mole percent comonomer incorporation was calculated from the mole fractions:

$$B[\text{mol \%}]=100*fB$$

$$E[\text{mol \%}]=100*fE$$

The weight percent comonomer incorporation was calculated from the mole fractions:

$$B[\text{wt \%}]=100*(fB*56.11)/((fE*28.05)+(fB*56.11)+((1-(fE+fB))*42.08))$$

$$E[\text{wt \%}]=100*(fE*28.05)/((fE*28.05)+(fB*56.11)+((1-(fE+fB))*42.08))$$

BIBLIOGRAPHIC REFERENCES

1—Klimke, K., Parkinson, M., Piel, C., Kaminsky, W., Spiess, H. W., Wilhelm, M., Macromol. Chem. Phys. 2006; 207:382.

2—Parkinson, M., Klimke, K., Spiess, H. W., Wilhelm, M., Macromol. Chem. Phys. 2007; 208:2128.

3—Pollard, M., Klimke, K., Graf, R., Spiess, H. W., Wilhelm, M., Sperber, O., Piel, C., Kaminsky, W., Macromolecules 2004; 37:813.

4—Filip, X., Tripon, C., Filip, C., J. Mag. Resn. 2005, 176, 239.

5—Griffin, J. M., Tripon, C., Samoson, A., Filip, C., and Brown, S. P., Mag. Res. in Chem. 200745, S1, S198.

6—Castignolles, P., Graf, R., Parkinson, M., Wilhelm, M., Gaborieau, M., Polymer 50 (2009) 2373.

7—Busico, V., Cipullo, R., Prog. Polym. Sci. 26 (2001) 443.

8—Busico, V., Cipullo, R., Monaco, G., Vacatello, M., Segre, A. L., Macromoleucles 30 (1997) 6251.

9—Zhou, Z., Kuemmerle, R., Qiu, X., Redwine, D., Cong, R., Taha, A., Baugh, D. Winniford, B., J. Mag. Reson. 187 (2007) 225.

10—Busico, V., Carbonniere, P., Cipullo, R., Pellecchia, R., Severn, J., Talarico, G., Macromol. Rapid Commun. 2007, 28, 1128.

11—Resconi, L., Cavallo, L., Fait, A., Piemontesi, F., Chem. Rev. 2000, 100, 1253.

DSC Analysis, Melting Temperature (Tm) and Crystallization Temperature (Tc):

measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30° C. to +225° C.

Crystallization temperature and heat of crystallization (Hc) are determined from the cooling step, while melting temperature and heat of fusion (Hf) are determined from the second heating step.

Haze was determined according to ASTM D1003-00 on cast films of 50 µm thickness produced on a monolayer cast film line with a melt temperature of 250° C. and a chill roll temperature of 20° C.

Hot-Tack Force

The hot-tack force was determined according to ASTM F1921-12—Method B on a J&B Hot-Tack Tester on a 50 µm thickness film produced on a monolayer cast film line.

All film test specimens were prepared in standard atmospheres for conditioning and testing at 23° C. (±2° C.) and 50% (±10%) relative humidity.

The minimum conditioning time of test specimen in standard atmosphere before start testing is at least 16 h. The minimum storage time between extrusion of film sample and start testing is at least 88 h.

The hot tack measurement determines the strength of heat seals formed in the films, immediately after the seal has been made and before it cools to ambient temperature. The hot-tack measurement was performed under the following conditions.

Film Specimen width: 25.4 mm.
Seal bar length: 50 mm
Seal bar width: 5 mm
Seal bar shape: flat
Seal Pressure: 0.3 N/mm$^2$.
Seal Time: 0.5 sec.
Cool time: 99 sec.
Peel Speed: 200 mm/sec.
Start temperature: 90° C.
End temperature: 140° C.
Increments: 10° C.

The hot tack force was measured as a function of temperature within the temperature range and with temperature increments as indicated above. The number of test specimens were at least 3 specimens per temperature. The output of this method is a hot tack curve; a force vs. temperature curve.

The hot tack force (HTF) is evaluated from the curve as the highest force (maximum peak value) with failure mode "peel".

Sealing Initiation Temperature (SIT); Sealing End Temperature (SET), Sealing Range:

The method determines the sealing temperature range (sealing range) of polypropylene films, in particular cast films according to ASTM F1921-12. Seal pressure, cool time and peel speed are modified as stated below.

The sealing temperature range is the temperature range, in which the films can be sealed according to conditions given below.

The lower limit (heat sealing initiation temperature (SIT)) is the sealing temperature at which a sealing strength of >5 N is achieved. The upper limit (sealing end temperature (SET)) is reached, when the films stick to the sealing device.

The sealing range is determined on a J&B Universal Sealing Machine Type 3000 with a cast film of 50 μm thickness with the following further parameters:

Specimen width: 25.4 mm

Seal Pressure: 0.1 N/mm$^2$

Seal Time: 0.1 sec

Cool time: 99 sec

Peel Speed: 10 mm/sec

Start temperature: 80° C.

End temperature: 150° C.

Increments: 10° C.

specimen is sealed A to A at each sealbar temperature and seal strength (force) is determined at each step.

The temperature is determined at which the seal strength reaches 5 N.

Tensile Modulus

Tensile moduli in machine (MD) direction were determined acc. to ISO 527-3 on cast films with a thickness of 50 μm at a cross head speed of 100 mm/min.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature until being processed further.

Examples

Component (A):

Propylene-ethylene-1-butene terpolymer for the Inventive Examples (IE) and the comparative example (CE) was made in a Borstar PP pilot plant in the slurry loop reactor only with an upstream prepolymerization step.

The gas phase reactor (GPR) was used as high pressure (HP) flash with pressure of 1700 kPa and bed level of 70 cm. 35 kg/h propylene flush was used to keep the direct feed line open between the loop and GPR.

The catalyst used was Avant ZN180M, provided by LyondelBasell. Cocatalyst was TEAL and the external donor was Donor D Table 1 shows the polymerization data for the propylene-ethylene-1-butene terpolymer.

TABLE 1

| Prepolymerization | unit | IE1 | IE2 | IE3 | CE1 |
|---|---|---|---|---|---|
| Temperature | [° C.] | 20 | 20 | 20 | 20 |
| Pressure | [kPa] | 5500 | 5500 | 5500 | 5500 |
| Al/donor | [mol/mol] | 10 | 10 | 10 | 10 |
| Al/Ti | [mol/mol] | 150 | 150 | 150 | 150 |
| Residence time | [min] | 20 | 20 | 20 | 20 |
| Loop | | | | | |
| Temperature | [° C.] | 63 | 63 | 63 | 63 |
| Pressure | [kPa] | 5500 | 5500 | 5500 | 5500 |
| Feed H2/C3 ratio | [mol/kmol] | 0.8 | 0.6 | 0.6 | 1.0 |
| Feed C2/C3 ratio | [mol/kmol] | 5.5 | 10.8 | 11.8 | 6.2 |
| Feed C4/C3 ratio | [mol/kmol] | 311 | 306 | 303 | 194 |
| Polymer residence time | [h] | 0.5 | 0.5 | 0.5 | 0.5 |
| MFR$_2$ | [g/10 min] | 2.30 | 1.80 | 1.75 | 4.3 |

The so obtained terpolymers have been visbroken by using a co-rotating twin-screw extruder at 200-230° C. and using an appropriate amount of (tert.-butylperoxy)-2,5-dimethylhexane (Trigonox 101, distributed by Akzo Nobel, Netherlands) to achieve the target MFR2 as mentioned in table 2.

All products were stabilized with 0.2 wt % of Irganox B225 (1:1-blend of Irganox 1010 (Pentaerythrityl-tetrakis (3-(3',5'-di-tert.butyl-4-hydroxytoluyl)-propionate and tris (2,4-di-t-butylphenyl) phosphate) phosphite) of BASF AG, Germany) and 0.1 wt % calcium stearate.

TABLE 2

Properties of terpolymers (i.e. propylene composition) after visbreaking

| | | IE1 | IE2 | IE3 | CE1 |
|---|---|---|---|---|---|
| MFR$_2$ | [g/10 min] | 7.7 | 6.3 | 6.2 | 5.8 |
| VR | [−] | 3.4 | 3.5 | 3.5 | 1.35 |
| C2 (total) | [wt %] | 0.5 | 1.1 | 1.1 | 0.6 |
| C4 (total) | [wt %] | 6.8 | 6.0 | 7.0 | 7.6 |
| XCS | [wt %] | 6.8 | 10.7 | 11.6 | 7.8 |
| Tm | [° C.] | 140 | 134 | 134 | 140 |

VR visbreaking ratio

The inventive and comparative propylene compositions were converted to monolayer cast films with a thickness of 50 μm on a PM30 cast line (type laboratory extruder provided by Plastik Maschinenbau GmbH., Germany). The equipment consists of an extruder, chill roll with air knife and a winder.

A PP 3-zone screw with a diameter of 30 mm, 25 D length, 200 mm die, die gap 0.5 mm is applied in combination with a coat-hanger slit die assembly.

The extrusion parameters were as follows:

Extruder temperature profile: 220° C./240° C./250° C./260° C./260° C. (Melt temperature 250° C.; melt pressure 61 bar)

Extruder speed: 50 rpm

Chill roll temperature: 20° C.

take-off speed: 10.2 m/min

In Table 3 the optical parameters (before sterilization, b.s.) as well as the sealing performance, tensile modulus and hot tack force can be seen.

TABLE 3

Sealing performance, tensile and optics before sterilization (b.s.)

|  |  | IE1 | IE2 | IE3 | CE1 |
|---|---|---|---|---|---|
| Tensile modulus (MD) | [MPa] | 482 | 382 | 404 | 471 |
| SIT (DSC) | [° C.] | 112 | 108 | 108 | 114 |
| Tm − SIT |  | 28 | 26 | 26 | 26 |
| Hot-tack | [N] | 2.7 | 4.1 | 3.1 | 1.9 |
| Haze b.s. | [%] | 0.56 | 0.52 | 0.58 | 0.94 |
| Relation (I) |  | 2324 | 3012 | 2159 | 952 |

$$\text{Relation}(I) = \frac{\text{Tensile modulus}(MD) \times \text{Hot} - \text{tack}}{\text{Haze } b.s.}$$

The films were furthermore steam sterilized.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature until being processed further.

The optical parameters after sterilization (a.s.) can be seen in Table 4.

TABLE 4

Optics after sterilization (a.s.)

|  |  | IE1 | IE2 | IE3 | CE1 |
|---|---|---|---|---|---|
| Haze | % | 6.07 | 10.22 | 5.82 | 7.75 |

From the above tables it can be clearly seen that the inventive polypropylene compositions are characterised by an advantageous combination of low sealing initiation temperature (SIT), high hot-tack and good optical properties, like low haze, thus showing an improved overall performance (relation (1)) when converted into films.

The invention claimed is:

1. A polypropylene composition comprising:
   (A) at least 50.0 wt % of a propylene terpolymer comprising:
   (i) ethylene-derived comonomer units in an amount of from 0.5 to 1.5 wt % and
   (ii) comonomer units derived from a C4 to C10 α-olefin in an amount of from 5.5 to 15.0 wt %,
   whereby the terpolymer has been visbroken with a visbreaking ratio (VR)
   as defined by equation (I)

$VR = MFR_{final}/MFR_{start} > 1.5$ wherein
   "$MFR_{final}$" is the $MFR_2$ (230° C./2.16 kg) of the propylene terpolymer copolymer after visbreaking and
   "$MFR_{start}$" is the $MFR_2$ (230° C./2.16 kg) of the propylene terpolymer copolymer before visbreaking,
   whereby the $MFR_{final}$ (230° C., 2.16 kg, ISO1133) is in a range of 1.5 to 15.0 g/10 min and
   (B) optionally one or more additives in a total amount of from 0.0 up to 5.0 wt %, based on the composition, the one or more additives comprising one or more slip agents, one or more anti-block agents, one or more UV stabilizers, one or more alpha and/or beta nucleating agents, one or more antistatic agents, or one or more antioxidants;
   wherein the polypropylene composition has a hot-tack force determined on 50 μm cast film in the range of from 2.0 to 7.0 N.

2. The polypropylene composition according to claim 1, wherein the comonomer (ii) is selected from 1-butene, 1-hexene or 1-octene.

3. The polypropylene composition according to claim 2, wherein the comonomer (ii) is 1-butene.

4. The polypropylene composition according to claim 1, wherein "$MFR_{start}$" (230° C./2.16 kg) of the propylene terpolymer copolymer before visbreaking is in the range of 0.5 to lower than 10.0 g/10 min.

5. The polypropylene composition according to claim 1, wherein the visbroken propylene terpolymer has a xylene cold soluble (XCS) content in the range of 3.0 to below 20.0 wt %.

6. The polypropylene composition according to claim 1, wherein the difference between the melting temperature Tm of the visbroken propylene terpolymer and the sealing initiation temperature SIT of a cast film of 50 μm thickness is;

$Tm-SIT>24°$ C.

7. The polypropylene composition of claim 1, being prepared by, the process comprising the steps of:
   (i) preparing the propylene terpolymer by polymerizing propylene, ethylene and a C4 to C10 α-olefin in the presence of a Ziegler-Natta catalyst,
   (ii) subsequent visbreaking the propylene terpolymer and
   (iii) optionally mixing said visbroken propylene terpolymer (A) with one or more additives.

8. A method comprising producing articles with a polypropylene composition according to claim 1.

9. The method according to claim 8, wherein the articles are sterilizable articles.

10. An article comprising the polypropylene composition according to claim 1.

11. The article according to claim 10, wherein the article is an unoriented film comprising more than 90% of the composition according to claim 1, wherein the film is a cast film or a blown film.

12. The article according to claim 11, wherein the film is a cast film, said cast film having
    (i) a sealing initiation temperature in the range of from 90° C. to 112° C. determined on 50 μm cast film and
    (ii) a hot-tack force determined on 50 μm cast film in the range of from 2.0 to 7.0 N.

13. The article according to claim 11, wherein
    the film has a haze determined according to ASTM D 1003-00 measured on a 50 μm cast film of below 3.0% and has a haze determined according to ASTM D 1003-00 measured on a 50 μm cast film after sterilization (steam sterilization at 121° C. for 30 min) of below 12.0%.

14. The article according to claim 11, wherein the film has an overall performance defined by:

Relation (I)=Tensile modulus(MD)×Hot-tack/Haze b.s., whereby relation (I) is at least 1000 MPa*N/%.

15. The article according to claim 10, comprising a sealing layer in a multi-layer film.

\* \* \* \* \*